(12) United States Patent
Kinghorn et al.

(10) Patent No.: US 11,552,717 B2
(45) Date of Patent: Jan. 10, 2023

(54) ACTIVE ARRAY ANTENNA WITH SUB-ARRAYS AND A METHOD FOR ITS CALIBRATION

(71) Applicant: Leonardo UK Ltd, London (GB)

(72) Inventors: Anthony Kinghorn, Basildon Essex (GB); Alexander Robinson, Basildon Essex (GB)

(73) Assignee: LEONARDO UK LTD, London (GB)

( * ) Notice: Subject to any disclaimer, the term of this patent is extended or adjusted under 35 U.S.C. 154(b) by 0 days.

(21) Appl. No.: 17/290,390

(22) PCT Filed: Nov. 1, 2019

(86) PCT No.: PCT/EP2019/079973
§ 371 (c)(1),
(2) Date: Apr. 30, 2021

(87) PCT Pub. No.: WO2020/089458
PCT Pub. Date: May 7, 2020

(65) Prior Publication Data
US 2021/0359770 A1 Nov. 18, 2021

(30) Foreign Application Priority Data
Nov. 1, 2018 (GB) ...................................... 1817854

(51) Int. Cl.
*H04B 17/12* (2015.01)
*H04B 17/21* (2015.01)
*H01Q 3/26* (2006.01)

(52) U.S. Cl.
CPC ........... *H04B 17/12* (2015.01); *H01Q 3/2694* (2013.01); *H04B 17/21* (2015.01)

(58) Field of Classification Search
CPC ...... H04B 17/12; H04B 17/102; H04B 17/21; H01Q 3/26; H01Q 3/2694
See application file for complete search history.

(56) References Cited

U.S. PATENT DOCUMENTS 9,876,514 B1 * 1/2018 Corman .................. G06F 3/061
9,948,408 B1    4/2018 Gomadam et al.
(Continued)

FOREIGN PATENT DOCUMENTS

CA    2713606 A1    2/2012
JP    2010068482 A    3/2010
(Continued)

OTHER PUBLICATIONS

Combined Search and Examination Report issued in corresponding Patent Application No. GB1817854.1 dated Apr. 17, 2019.
(Continued)

*Primary Examiner* — Thanh C Le
(74) *Attorney, Agent, or Firm* — Buchanan Ingersoll & Rooney PC

(57) ABSTRACT

The present disclosure relates to manufacture of an active array antenna from a combination of modular sub-arrays, nominally of equal size; each sub-array being associated with a separate receiver and/or transmitter.

A solution to calibrating a modular array is the inclusion of a calibration manifold having multiple 1st ports that connect to respective sub-arrays between their passive network and their respective receiver and/or transmitter.

Each of the first ports communicate with a common second port through which a signal can be introduced in order to be received at each element of each sub array, or through which a signal from any element of any sub-array can be received. This allows any element of the sub array to be calibrated at any time including during operation.

20 Claims, 3 Drawing Sheets

(56) References Cited

U.S. PATENT DOCUMENTS

| | | | |
|---|---|---|---|
| 2007/0210959 A1 | 9/2007 | Herd et al. | |
| 2008/0036648 A1 | 2/2008 | Green et al. | |
| 2011/0006949 A1 | 1/2011 | Webb | |
| 2016/0226570 A1 | 8/2016 | Nicholls et al. | |
| 2017/0077613 A1 | 3/2017 | Banu et al. | |
| 2020/0076515 A1* | 3/2020 | Jain | G06F 1/3206 |
| 2021/0159594 A1* | 5/2021 | Tiebout | H04B 17/12 |
| 2021/0242948 A1* | 8/2021 | Kong | H01Q 3/267 |
| 2021/0257730 A1* | 8/2021 | Ma | H04B 7/086 |
| 2021/0351507 A1* | 11/2021 | Gorbachov | H04B 17/21 |
| 2022/0128654 A1* | 4/2022 | Rosu | H01Q 3/267 |

FOREIGN PATENT DOCUMENTS

| | | |
|---|---|---|
| JP | 2018019384 A | 2/2018 |
| JP | 2018526929 A | 9/2018 |

OTHER PUBLICATIONS

International Search Report (PCT/ISA/210) and Written Opinion (PCT/ISA/237) dated Feb. 10, 2020, by the European Patent Office as the International Searching Authority for International Application No. PCT/EP2019/079973.

First Office Action dated Jul. 5, 2022, by the Japanese Patent Office in corresponding Japanese Patent Application No. 2021-520175, and an English Translation of the Office Action. (8 pages).

* cited by examiner

ACTIVE ARRAY ANTENNA WITH SUB-ARRAYS AND A METHOD FOR ITS CALIBRATION

The present invention relates to an electronically scanned active array antenna comprising multiple sub-arrays and means to calibrate an electronically scanned active array antenna.

An electronically scanned active array antenna of conventional design comprises an array of elements each comprising an element antenna and a element level control device, controlling amplitude, phase and/or or delay of a signal to/from the element antenna, together with a passive beamforming network through which the signals from each element are combined when the antenna is receiving a signal and through which a signal is divided for receipt by each control device when the antenna is transmitting.

Following manufacture of an electronically scanned antenna a calibration procedure is carried out in which the array elements are adjusted to ensure the antenna is able to accurately steer beams and form desired beam patterns. This is required because current manufacturing processes do not enable each array element to be formed identically and because the path provided by the passive beamforming network between each element and a network's output, may not have identical characteristics.

The calibration procedure involves use of external test equipment, such as, for example a Near Field Scanner, that provides an accurate external reference signal. In the example of a Near Field Scanner, the test equipment is placed in front of each element in turn and said element energised. The control device associated with that element can then be adjusted to compensate for any imperfections.

The element level control devices can be adjusted during operation to account for changes in performance that may be a result of changes in temperature. These adjustments are typically made based on expected deviation as a result of e.g. sensing a change of temperature of the array. Through these adjustments and because the characteristics of the passive beamforming network typically remain stable over the operational lifetime of the antenna, an antenna can be kept calibrated for a long period of time without need for repeating the initial calibration procedure.

This approach is simple but has the disadvantages described below:
a) If any part of the array fails and is replaced, the entire array may need to be re-calibrated, which may involve sending it back to the factory where it was manufactured.
b) Because it is generally impractical to monitor the performance of the array in operation without the use of external test systems, failures or degradations of the element's electronics may degrade array performance without notice.
c) Each time it is desired to construct an active array antenna of a different size it is necessary to manufacture a new bespoke design of passive beamforming network structure which is time consuming and expensive.
d) High gain components are required at element level to overcome losses in the passive beamforming network. This increases the power consumption of the antenna which is problematic where power is limited, e.g. when used in aircraft. It also requires high power drivers to transmit signals, which introduces a reliability risk.
e) The use of a fixed passive beamforming network precludes the possibility of using certain beamforming techniques. The provision of multiple switchable passive beamforming networks is a way to overcome this limitation but is itself complex to design and manufacture and creates its own substantial losses.

In order to overcome the problems above it would be desirable to manufacture active array antenna from a combination of modular sub-arrays, nominally of equal size; each sub-array being associated with a separate receiver and/or transmitter. Manufacture of active array antenna using standardised modules would make it more cost effective to produce antenna of different sizes. Further the outputs of each sub-array could be used in many different ways to form complex beams, including multiple simultaneous receive beams.

Notwithstanding these potential advantages utilisation of modular active arrays has been hindered by difficulty in maintaining calibration of the active components at the sub-array level which are unlikely to remain aligned during the service life of the antenna. The present invention was conceived to provide a solution to this problem.

According to a first aspect of the invention there is provided a system including an active array antenna comprising multiple sub-arrays; each sub-array comprising: a plurality of elements each arranged for transmitting and/or receiving a signal, each element comprising an antenna and element communication circuitry, the element communication circuitry providing means for adjustment of one or more of amplitude, phase and delay of a signal to and/or from the element's respective antenna; a passive network that connects the elements to a common port; the active array antenna comprising: sub-array communication circuitry associated with each sub-array, each arranged for transmitting and/or receiving a signal to/from the elements of its respective sub-array via the sub-array's passive network, each sub-array communication circuitry arranged to provide adjustment of one or more of amplitude, phase and delay of a signal to/from its associated sub-array; a manifold that connects multiple first ports to a second common port, each of the first ports being connected through a junction located between the passive network of each sub-array and its associated sub-array communication circuitry; means for injecting a first test signal into the calibration manifold about the second port and means for measuring the corresponding outputs from each sub-array communication circuitry; and each sub-array communication circuitry adapted to transmit a second test signal, and means for measuring the transmitted second test signal at about the second port of the calibration manifold.

According to another aspect of the invention there is provided an active array antenna comprising multiple sub-arrays; each sub-array comprising: a plurality of elements each arranged for transmitting and/or receiving a signal, each element comprising an antenna and element communication circuitry, the element communication circuitry providing means for adjustment of one or more of amplitude, phase and delay of a signal to and/or from the element's respective antenna; a passive network that connects the elements to a common port; sub-array communication circuitry associated with each sub-array, each arranged for transmitting and/or receiving a signal to/from the elements of its respective sub-array via the sub-array's passive network, each sub-array communication circuitry arranged to provide adjustment of one or more of amplitude, phase and delay of a signal to/from its associated sub-array; a manifold that connects multiple first ports to a second common port, each of the first ports being connected through a junction located between the passive network of each sub-array and its associated sub-array communication circuitry.

This arrangement allows for the sub-array communication circuitry to be calibrated before the antenna is put into operational service and then again from time-to-time during operational.

The following features may relate to either aspect of the invention.

The system may comprise means (e.g. a vector network analyser to determine for each sub-array communication circuitry an error associated with the sub-array communication circuitry's output in response to the injected first test signal, and means using the error to apply a correction.

The error may relate to one or more of the amplitude, phase and delay of the communication circuitry's output.

The system may comprise a control means associated with each sub-array communication circuitry arranged to apply the correction to its associated sub-array communication circuitry. The control means may comprise a controller for each sub-array and a central controller that controls the controllers.

Alternatively, the correction may be applied by the system to which the active array antenna is connected, the system providing a digital input to each sub-array circuitry for transmission by the sub-arrays modified to compensate for the error associated with the respective sub-array circuitry. When the antenna is in a receiving mode, the system applies a respective correction to the digital output from each sub-array circuitry based on the error associated with the sub-array.

The system may comprise means (e.g. a vector network analyser) to determine an error associated with the corresponding output signal taken at about the second port of the calibration manifold in response to the generation of the second test signal from a sub-array communication circuitry of a sub-array. The determined error may be stored in a memory store.

The second port of the calibration manifold may terminate in a substantially matched load. This minimises reflections of any signal, used for calibration or otherwise, that enters the calibration manifold through one or more of the first ports, back out of the first ports towards the sub-array communication circuitry and passive networks.

The system may comprise a coupler coupled to the calibration manifold through which the test signal is injected into the calibration manifold and/or through which the means for measuring the test signal is connected to the calibration manifold. The coupler may be coupled to a common trunk of the calibration manifold.

The system may comprise a first coupler and a second coupler, the first coupler may be coupled about the second port of the calibration manifold (e.g. to the common trunk) to transmit the first test signal from a test signal generator into the calibration manifold; the second coupler may be coupled about the second port (e.g. to the common trunk) for carrying signals that have entered the calibration manifold from the first ports to a test signal receiver such as a vector network analyser.

The coupler provides means for the injection and receiving of test signals into/from the manifold whilst minimally perturbing the match in the calibration manifold, thereby preserving the calibration manifold's reciprocal property. The couplers, or each of the first and second couplers, may have a coupling factor of −30 dB or less.

The junctions may be arranged such that a signal that enters the junction from any of the passive network, sub-array communication circuitry or calibration manifold will be split and output towards the other two. The junction may be arranged to split an incoming signal from one of the above substantially equally between the other two.

Each sub-array communication circuitry may provide a digital output of the antenna, e.g. to a system to which the antenna is connected. The digital output allows for multiple different and/or simultaneous beam forming to be carried out without the need a multiplicity of separate analogue combining networks.

In another aspect of the invention there is provided a method of calibrating an active array antenna comprising multiple sub-arrays; each sub-array comprising: a plurality of elements each arranged for transmitting and/or receiving a signal, each element comprising an antenna and element communication module, the element communication module providing means for adjustment of one or more of amplitude, phase and delay of a signal to and/or from the element's respective antenna; a passive combining network that provides a combined output from the plurality of elements of the sub-array; the active array antenna further comprising:

a sub-array communication module associated with each sub-array, each arranged for transmitting and/or receiving a signal to/from its respective sub-array, and each sub-array communication module providing means for adjustment of one or more of amplitude, phase and delay of a signal to/from its associated sub-array; a manifold having multiple first ports that are connected through junctions located between the passive combining network of each sub-array and its associated sub-array communication module; and a second port that receives a combined signal from all of the first ports; the calibration method comprising:

i) injecting a test signal at the second port of the calibration manifold, measuring a resultant output of each sub-array communication module and using the measurements to calculate corrections to be applied to each sub-array communication module; and/or:

ii) injecting a test signal from each sub-array communication module and measuring the resultant signal at the second port of the calibration manifold; repeating for each sub-array communication module and using the measurements to calculate corrections to be applied to each sub-array communication module.

The method may comprise repeating i) and/or ii) during operation of the antenna array.

The antenna may from time-to-time be switched by a system to which the antenna is connected, from an operational state, e.g. a receive or transmit mode, into a calibration mode in which the sub-array circuitry is calibrated, and following calibration, the system may switch the antenna back to the operational state.

The method may further comprise injecting a test signal at each element of each sub-array and measuring the resulting signal taken about the second port of the calibration manifold; and using the measurement to calculate a correction to apply to the element communication circuitry to calibrate the element. This may be repeated for each element in turn in order to calibrate the plurality of elements.

The method may include injecting a test signal at about the second port of the calibration manifold and measuring the resulting signal transmitted from the antenna of an element; and using the measurement to calculate corrections to be applied to the element communication circuitry to calibrate the element. This may be repeated for each element of each sub-array.

The invention will now be described by way of example with reference to the following figures in which.

Figure 1:
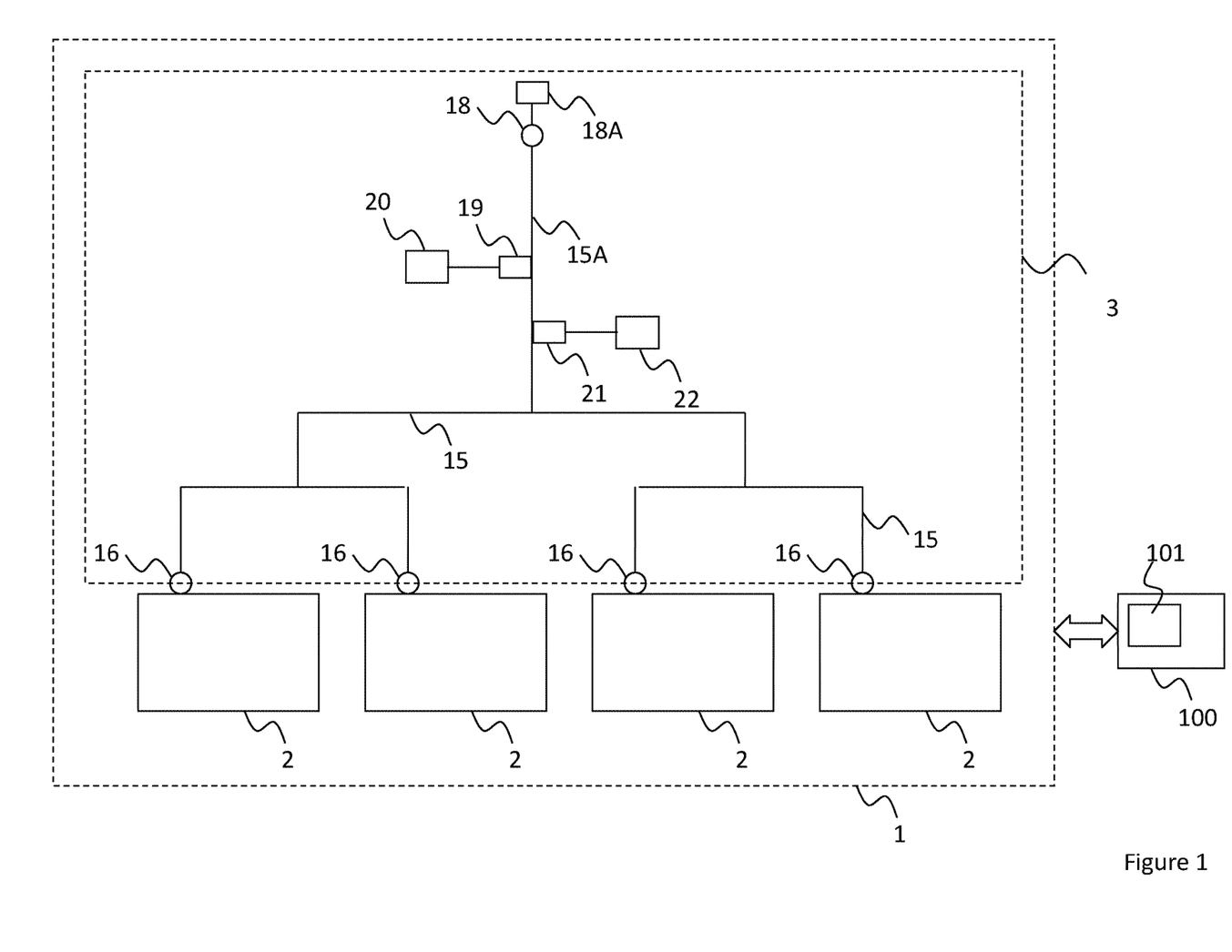
FIG. 1 is a schematic of a system including an electronic active array antenna comprising four modular sub-arrays and a calibration network.

The active array antenna 1 of FIG. 1 comprises four sub-arrays 2 each connected to a calibration network 3 used to calibrate the sub-arrays 2.

Figure 2:
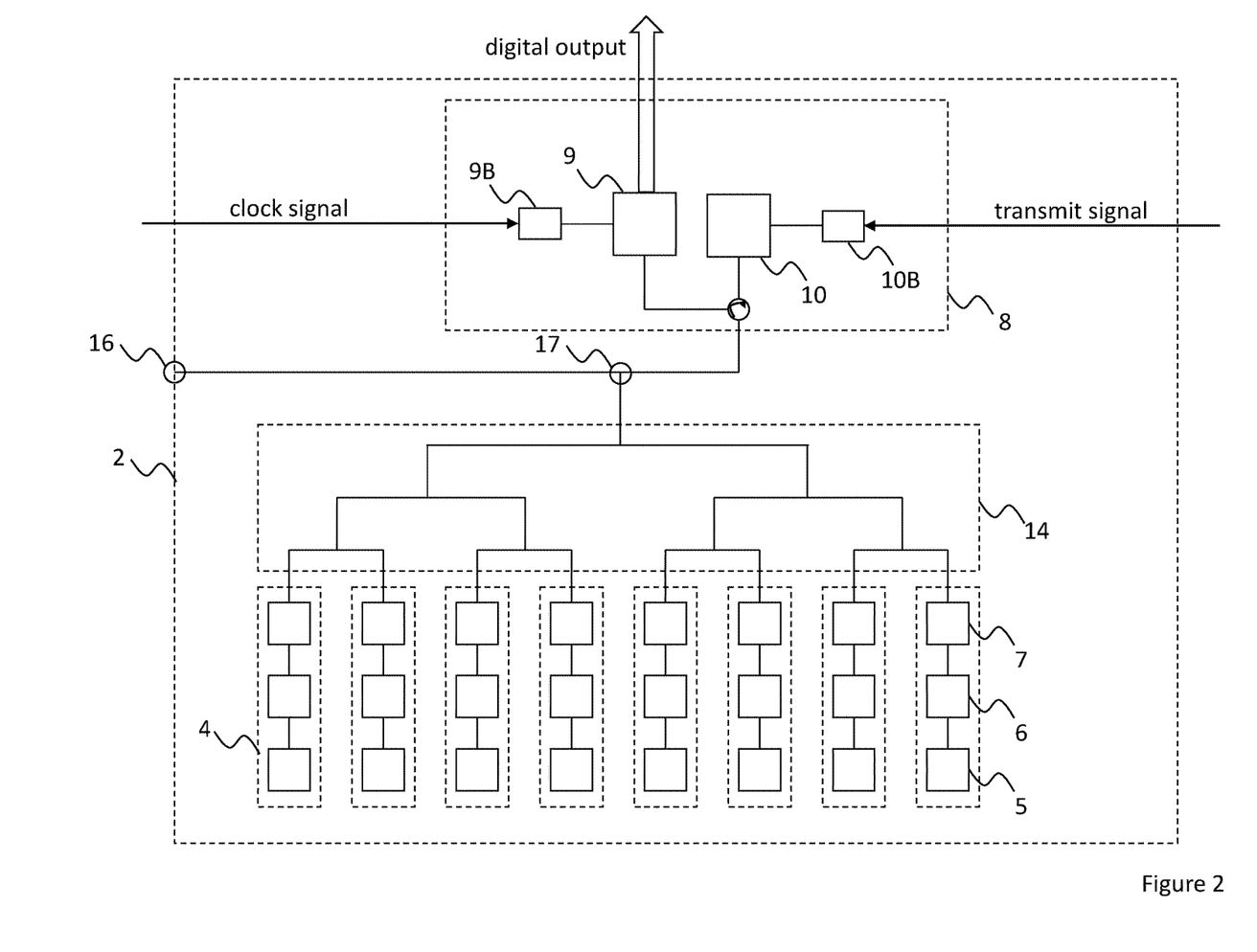
FIG. 2 is a schematic of a sub-array of the active array antenna of FIG. 1.

With reference to FIG. 2, each sub array 2 comprises an array of elements 4 each arranged for transmitting and/or receiving a signal. Each element 4 includes an element antenna 5 and element communication circuit comprising, for example, an element transmitter and/or receiver 6 and a signal modifier 7, controlled by external control signals to control one or more of amplitude, phase and delay of a signal to and/or from the element's respective element antenna 5. The external control signals are provided to the elements from a system controller (of the system 100 (e.g. radar system) to which the active array antenna is connected) in order to achieve a system function, e.g. to form a specific beam shape in a specific direction.

Each sub-array 2 has separate sub-array communication circuitry 8. Each communication circuitry comprises a receiver 9 which receives signals from the array of elements 4 and outputs to a system to which the array antenna 1 is connected, and a transmitter 10 having an input connected to the system, and an output to the elements 4 of the sub-array communication circuitry's 8 respective sub-array 2. The circuitry may also include a circulator through which the transmitter and receiver connect to the array of elements 4.

The receiver 9 comprises an analogue to digital converter 9A arranged to receive a clock signal from a reference (not shown) and a clock signal modifier 9B controlled by an external digital control signal; transmitter 10 comprising a signal modifier 10A under control from a digital controller (not shown) of a system to which the antenna is connected, a power amplifier 10B and a circulator 11.

Each element 4 of a sub-array 2 is connected to its associated sub-array communication circuitry 8 via a sub-array passive network 14. The sub-array passive network 14 is arranged to carry signals from any one of elements 4 of a sub-array to T-splitter 17 (see below), and divide any signal entering the network 14 from the T-splitter 17 such that it is received by each of the elements 4 of the sub-array 2.

In a transmit mode, each sub-array communication circuit 8 is arranged to receive a signal from the system 100 to which the active array antenna 1 is connected, modify that signal (e.g. one or more of phase, amplitude and delay) for beam forming and/or steering, and transmit the modified signal to the elements 4 in its respective sub-array 2. The modified signals can then be further modified (e.g. one or more of phase, amplitude and delay) by each element's communication circuit.

Each sub-array communication circuit 8 can modify the signal from/to the system independently from the other sub-array communication circuits. Similarly each element communication circuit can modify a signal independently from the others in the sub array. This enables the antenna to be used to carry out complex beamforming techniques.

When the antenna 1 is transmitting, the transmitter 10 of each sub-array circuitry 8 receives a reference signal from the system. This is modified, under digital control, by a transmit signal modifier 10B such that the input to each passive network 14 is different but correlated in order to achieve the desired antenna beamforming.

When the antenna 1 is receiving, each receiver 9 of each sub-array receives a different but correlated analogue signal from its associated array of elements 4. Each sub-array receiver 9 converts the analogue input signal to digital form with reference to a common externally supplied reference clock signal. The timing of the reference clock signal can be individually modified for each sub-array receiver 9 by its respective clock signal modifier 9B in order to introduce the required delay to the digital output for the purpose of beamforming and error correction. Alternatively, the clock modifier 9B may be omitted and an equivalent correction applied by the system to the digital output of each sub-array receiver.

The calibration network 3 comprises a reciprocal calibration manifold 15 having a first port 16 associated with each sub-array 2 that is connected between the sub-array communication circuit 8 and the sub-array passive network 14 through T-splitter 17. The reciprocal calibration manifold 15 connects each of the first ports 16 to a single second port 18 via a common trunk 15A, such that a signal entering the manifold 15 through any of the first ports 16 will pass along the common trunk 15A to the second port 18 and that any signal entering the manifold 15 at the second port 18 or common trunk 15A will be divided so as to be received at all of the first ports 16.

The second port 18 is terminated in a matched load 18A to minimise reflections of any signal within the reciprocal calibration manifold 15. The matched load can be removed to allow external test equipment to be connected to the second port 18 for the purpose of calibration of the elements 4, as described below.

A first coupler 19 coupled to the common trunk 15A provides a connection for a vector network analyser 20 to the reciprocal calibration manifold 15 in order to receive calibration signals that have entered the reciprocal calibration manifold 15 through a first port 16. A second coupler 21 also coupled to the common trunk 15A provides a connection to the reciprocal calibration manifold 15 for a reference signal source 22 (forming part of the system 100) to send reference signals into the reciprocal calibration manifold 15.

Each of the first and second couplers 19, 21 favourably have a coupling factor of −30 dB or less. Low coupling factors are chosen to minimise any unwanted reflections within the calibration network 3.

The couplers 19, 21 are favourably arranged physically close to the second port 18 in order to conserve space; however, so long as the couplers 19, 21 are coupled to the common trunk 15A the physical spacing between the second port 18 and couplers 19, 21 can vary. Thus the phrase 'about the second port' should be taken to include arrangements where the couplers are coupled to the manifold 15 immediately adjacent the second port 18 as well as arrangements where they are coupled elsewhere about the common trunk 15A.

Because current manufacturing processes of electronically scanned array antenna are imperfect, it is unlikely that each element 4, e.g. each element antenna 5, transmitter 6 and signal modifier 7 within a sub-array will be formed identically. Further there may be imperfections within the sub-array passive network 14. Further still, it is unlikely that each sub-array communication circuitry 8 will behave identically. To correct for these errors the antenna requires calibrating.

A first calibration procedure is undertaken to ensure that each element 4 of each sub-array 2 of the active array antenna 1 is aligned on transmission and/or reception. In a first stage of the first calibration procedure, external test equipment (e.g. a near field scanner) is connected to the second port 18 of the calibration network 3 (the matched load having been removed if connected). An external test signal is applied to each element 4; the output signal from each element 4 passes via the sub-array passive network 14 into the reciprocal calibration manifold 15 via T-junction 17 and to the second port 18 where the signal is measured by the external test equipment. A difference determined between the output measured by the external test equipment and external test signal is stored in a memory store, e.g. initially of the test equipment and then transferred to store 101 of the system 100. This is repeated for each element 4 of the active array antenna 1 in turn.

In a second stage of the first calibration procedure, a reference signal from the external test equipment is transmitted via the second port 18 into the reciprocal calibration manifold 15. The reference signal passes through first ports 16 and is split by T-splitters 17 such that a portion of the reference signal is directed through the sub-array passive networks 14 of each sub array 2 to all the element circuits 4. Each element 4 of the antenna 1 is energised in turn and the output from the energised element's element antenna 5 in response to the calibration signal is measured by external test equipment positioned in front of the antenna 1. A difference determined between the measured output from the element 4 and the calibration signal is stored in the memory store.

It will be appreciated that the second stage may be carried out before the first stage.

To calibrate the sub-array communication circuits 8 of the array 1 a second calibration procedure is carried out. When carrying out the second procedure, the second port 18 of the reciprocal calibration manifold 15 is terminated with the matched load 18A. An internal reference signal from the reference signal source 22 is transmitted via the second coupler 21 into the reciprocal calibration manifold 15. The reference signal arrives at the first ports 16 associated with each sub-array 2 and a portion of the signal split by T-splitter 17 is received at the receiver 9 of each sub-array communication circuit 8.

For each sub-array circuit 8, an error associated with the difference between the output of the receiver 9 and the internal reference signal from the reference signal source 22 is determined and stored in a store 101 of the system 100 connected to the antenna 1.

In a second stage of the second calibration procedure, the transmitter 10 of a sub-array communication circuit 8 is caused to transmit an internal reference signal supplied from the system connected to the active array antenna 1. The signal is split by T-splitter 17 with a portion transmitted through the reciprocal calibration manifold 15 and via coupler 19 for measurement by the vector network analyser 20.

A difference between the internal reference signal provided by the system to the transmitter 10 and the signal measured by the vector network analyser 20 in response to transmitter's 10 transmission is determined and stored in the system's 100 memory store 101. This is repeated for the sub-array communication circuitry 8 of each sub-array 2 in turn.

During the second calibration procedure the elements 4 of the sub-array 2 associated with the sub-array circuitry 8 being tested are off to prevent spurious signals being transmitted from the elements 4 via the passive network 14 to the sub-array circuitry 8 or entering the calibration network 3.

It is important that the reciprocal calibration manifold 15 is well matched in order to minimise reflections that could upset calibration measurements. This is achieved through use of a matched load 18A at the second port 18, and ensuring that each port 16 is matched to its associated sub-array circuitry 8 and passive network 14 through T-splitter 17. In practice this can be achieved through the circulator within the sub-array circuitry 8 and contriving the arrangement of the passive network 14 (for example by employing Wilkinson power dividers within the network).

Again it will be appreciated that the second stage may be performed before the first stage. The second procedure may be carried out before the first procedure.

Following completion of the two calibration procedures the array antenna 1 is calibrated for use on both transmit and receive.

During use of the antenna 1, each element signal modifier 7 receives commands from a system controller of the system to adjust one or more of the phase, amplitude and delay of a signal outputted by the element circuit 6 to the element antenna 5 to provide the desired beamforming and to correct for the error determined for that respective element 5 in the first stage of the first calibration procedure. Similarly, the signal modifier 7 receives commands from the system controller to adjust one or more of the phase, amplitude and delay of a signal received by the element circuit 6 from the element antenna 5 to provide the desired beamforming and to correct for the error determined for that respective element 4 in the second stage of the first calibration procedure.

For each receiver 9 the system controller provides an individual correction based using the error derived for it during the first stage of the second procedure. This could be done in a variety of ways. For example, the sampling time of an individual sub-array receiver 9A can be adjusted by controlling the clock modifier 9B to adjust delay; amplitude can be adjusted by controlling the analogue to gain of the analogue to digital receiver circuit; or corrections of delay, phase, and/or amplitude may be applied to the digital output of the sub-array receiver.

The system controller uses the stored error for each transmitter 10 derived in the second stage of the second procedure to compensate for each transmitter individually. This could be done in a variety of ways. For example, and with reference to FIG. 2, the transmitter reference signal supplied by the system controller can be adjusted in one or more of amplitude, phase and delay by the signal modifier 10A prior to amplification by the power amplifier 10B.

In this way each sub-array communication circuitry 8 can be adjusted independently from the others in order to align the sub-array communication circuitry 8 of all of the sub-arrays 2.

Following initial calibration, once the antenna has been put into commission, e.g. deployed on a vehicle such as an aircraft, watercraft or the like, the element communication circuits 6 can be adjusted using conventional techniques to compensate for changes in performance that may result, for example, from changes in temperature.

The sub-array communication circuits 8 are expected to misalign whilst the antenna 1 is in commission. This may, for example, be due to age and/or temperature changes and thus may occur within a single occasion of use, e.g. within minutes or hours, as well as over longer periods of time such as following months or years of use. Misalignments at the sub-array level have a more detrimental effect on antenna performance as the effect the output of a whole sub-array with consequent correlated errors.

To compensate for this, the steps of the second calibration procedure may be repeated from time-to-time whilst the antenna is commissioned. For example the system may carry out the second calibration procedure each time the system is switched on.

The system may instead or additionally carry out the second calibration process at intervals during operation of the antenna 1. For example, the antenna 1 may from time-to-time be switched by the system from an operational state, e.g. a receive or transmit mode, into a calibration mode in which the elements 4 are de-energised and the second calibration procedure carried out (first and/or second stage). Following calibration, the system may switch the antenna to a transmit or receive mode in order to continue operational activities.

Figure 3:
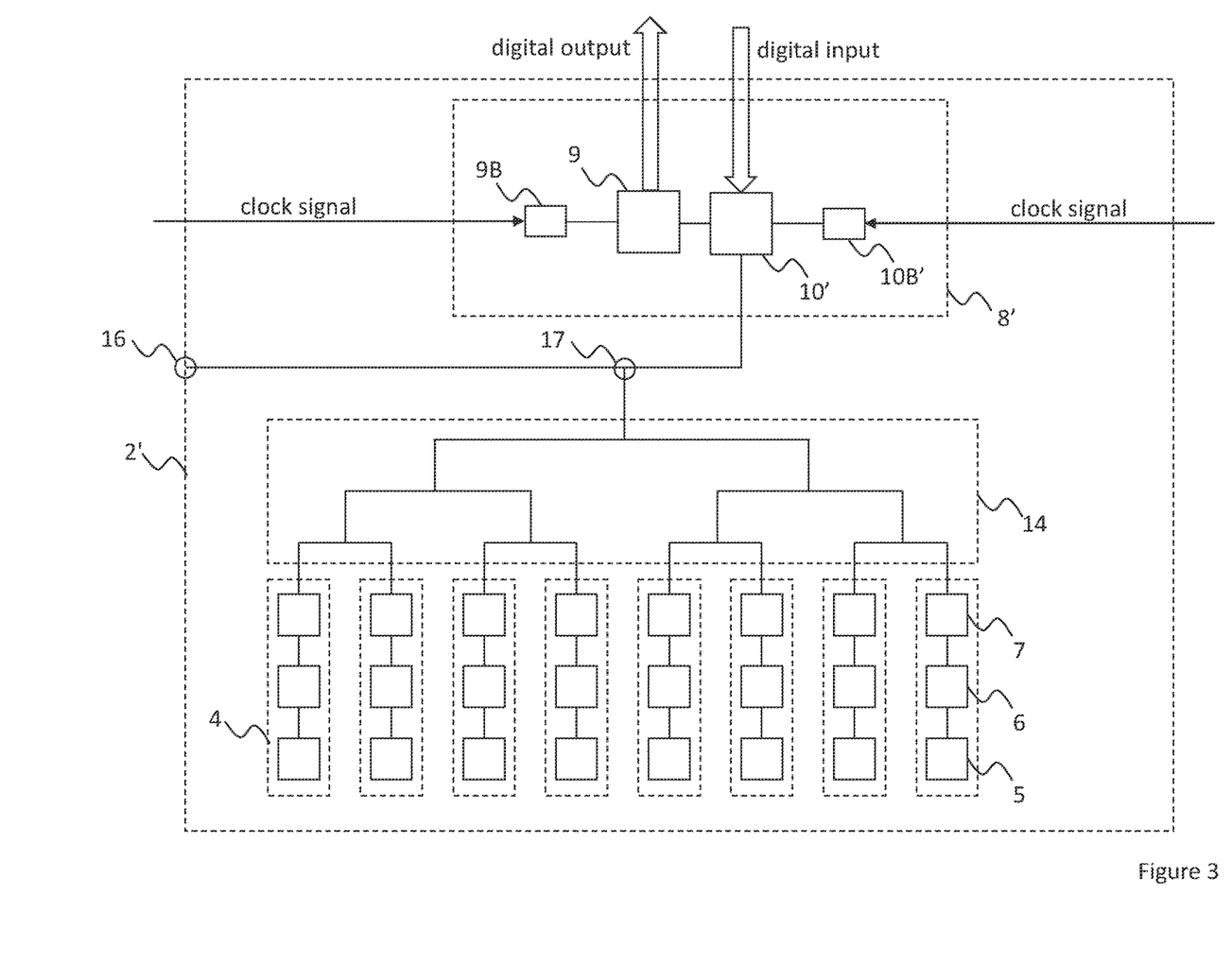
FIG. 3 is a schematic of a variant sub-array adapted to receive a digital output from a system to which the antenna is connected.

FIG. 3 illustrates a variant sub-array 2' having variant sub-array communication circuitry 8' that is adapted to receive digital signals from the system to which the antenna 1 is connected and transmit analogue signals to the elements 4. The sub-array communication circuitry 8' comprises a digital-to-analogue transmitter 10', power amplifier and a clock modifier. When the antenna 1 is transmitting, a digital signal from the system, which has already been adjusted by the system to compensate for amplitude for beamforming and to adjust for errors determined in the second stage of the calibration procedure, is converted to an analogue signal using the reference clock signal. The reference clock signal may be modified by the clock signal modifier based on a digital control signal from the system controller in order to modify the delay in the analogue signal. In an alternative arrangement the digital signal received by the digital to analogue converter may have already been adjusted by the system controller to provide the desired delay.

It will be appreciated that rather than carrying out the first stage for each of the elements and then the second stage for each of the elements, the first and second stages can be undertaken for a first element and then repeated for each element in turn.

In variant embodiments of the invention the active array antenna need not comprise both a transmitter and receiver. For example, where the active array antenna 1 is used for receive only each sub-array communication circuitry 8 and each element communication circuit 6 need only comprise a receiver. Similarly where the active array antenna 1 is used for transmit only, each sub-array communication circuitry 8 and each element communication circuit 6 need only comprise a transmitter In a less preferred variation, the sub-array circuitry may be arranged to provide an analogue rather than digital output to the system to which the antenna is connected.

The invention claimed is:

1. A system comprising:
an active array antenna having multiple sub-arrays,
each sub-array including:
a plurality of elements each arranged for transmitting and/or receiving a signal, each element having an antenna and element communication circuitry, the element communication circuitry having means for adjustment of one or more of amplitude, phase and delay of a signal to and/or from the element's respective antenna; and
a passive network for connecting the elements to a first port;
the active array antenna including:
sub-array communication circuitry associated with each sub-array, each being arranged for transmitting and/or receiving a signal to/from the elements of its respective sub-array via the sub-array's passive network, each sub-array communication circuitry being arranged to provide adjustment of one or more of amplitude, phase and delay of a signal to/from its associated sub-array;
a calibration manifold that connects multiple first ports of the multiple sub-arrays to a second port, each of the first ports being connected through a junction located between the passive network of each sub-array and its associated sub-array communication circuitry;
means for injecting a first test signal into the calibration manifold about the second port;
means for measuring corresponding outputs from each sub-array communication circuitry; each sub-array communication circuitry being configured to transmit a second test signal; and
means for measuring the transmitted second test signal at about the second common port of the calibration manifold.

2. A system according to claim 1, comprising:
means to determine for each sub-array communication circuitry an error associated with the sub-array communication circuitry's output in response to the injected first test signa; and
means using the error to apply a correction.

3. A system according to claim 2, comprising:
a control means associated with each sub-array communication circuitry arranged to apply the correction to its associated sub-array communication circuitry.

4. A system according to claim 1, comprising:
means arranged at about the second common port of the calibration manifold to determine an error associated with the corresponding output signal in response to generation of the second test signal from one of the sub-array communication circuitries; and
control means arranged to use the error to apply a correction.

5. A system according to claim 4, wherein the control means is associated with each sub-array communication circuitry and configured to use the error to apply a correction to its associated sub-array communication circuitry.

6. A system according to claim 1, wherein the second port of the calibration manifold terminates in a substantially matched load.

7. A system according to claim 6, comprising:
a coupler coupled about the second port of the calibration manifold through which the test signal is injected into the calibration manifold and/or through which the means for measuring the test signal is connected to the calibration manifold.

8. A system according to claim 7, comprising:
a first coupler and a second coupler, the first coupler being coupled at about the second port of the calibration manifold and arranged to transmit the test signal into the calibration manifold; and the second coupler being coupled about the second common port for receiving signals from the first ports.

9. A system according to claim 1, wherein the junctions are arranged such that a signal that enters the junction from any of the passive network, sub-array communication circuitry or calibration manifold will be split and output towards the other two of the passive network, sub-array communication circuitry or calibration manifold.

10. A system according to claim 9, wherein the signal is split substantially equally between the other two of the passive network, sub-array communication circuitry or calibration manifold.

11. A system according to claim 1, wherein each sub-array communication circuitry has a digital output and/or digital input.

12. A system according to claim 1, wherein the sub-array communication circuitry has a digital output from the active array antenna and an analogue input to the active array antenna.

13. An active array antenna comprising:
multiple sub-arrays, each sub-array including:
- a plurality of elements each arranged for transmitting and/or receiving a signal, each element including an antenna and element communication circuitry, the element communication circuitry providing means for adjustment of one or more of amplitude, phase and delay of a signal to and/or from the element's respective antenna;
- a passive network that connects the elements to a first port;
- sub-array communication circuitry associated with each sub-array, each arranged for transmitting and/or receiving a signal to/from the elements of its respective sub-array via the sub-array's passive network, each sub-array communication circuitry arranged to provide adjustment of one or more of amplitude, phase and delay of a signal to/from its associated sub-array; and
- a calibration manifold that connects multiple first ports to a second common port, each of the first ports being connected through a junction located between the passive network of each sub-array and its associated sub-array communication circuitry.

14. An active array antenna according to claim 13, wherein the second common port of the calibration manifold terminates with a substantially matched load.

15. A method of calibrating an active array antenna having multiple sub-arrays, each sub-array including:
a plurality of elements each arranged for transmitting and/or receiving a signal, each element comprising an antenna and element communication circuitry, the element communication circuitry providing means for adjustment of one or more of amplitude, phase and delay of a signal to and/or from the element's respective antenna;
a passive network that connects the elements to a first port;
the active array antenna further including:
sub-array communication circuitry associated with each sub-array, each arranged for transmitting and/or receiving a signal to/from the elements of its respective sub-array via the sub-array's passive network, each sub-array communication circuitry arranged to provide adjustment of one or more of amplitude, phase and delay of a signal to/from its associated sub-array;
a calibration manifold that connects multiple first ports to a second port, each of the first ports being connected through a junction located between the passive network of each sub-array and its associated sub-array communication circuitry;
the calibration method comprising:
i) injecting a test signal into the calibration manifold about the second port, measuring a resultant output of each sub-array communication circuitry and using the measurements to calculate corrections to be applied to each sub-array communication circuitry or output thereof;
and/or:
ii) injecting a test signal from each sub-array communication circuitry and measuring the resultant signal at about the second port of the calibration manifold, repeating for each sub-array communication circuitry, and using resultant signal measurements to calculate corrections to be applied to each sub-array communication circuitry or input thereof.

16. A method according to claim 15, comprising:
injecting a test signal at each element of each sub-array and measuring the resulting signal; and
using the measurements to calculate corrections to apply to the element communication circuitry; and/or
injecting a test signal and measuring the resulting signal transmitted by each element of each sub-array, and using resulting signal measurements to calculate corrections to be applied to the element communication circuitry.

17. A method according to claim 15, comprising:
injecting a test signal at each element of each sub-array and measuring the resulting signal at the second port of the calibration manifold; and
using resultant signal measurements to calculate corrections to apply to the element communication circuitry to calibrate the plurality of elements; and/or
injecting a test signal at the second port of the calibration manifold and measuring the resulting signal transmitted by each element of each sub-array, and using resulting signal measurements to calculate corrections to be applied to the element communication modules to calibrate the plurality of elements.

18. A method according to claim 15, comprising:
repeating the steps of i) and/or ii) of during operation of the antenna array.

19. A method according to claim 15, comprising:
Injecting a test signal into the calibration manifold via a coupler coupled to the calibration manifold about the second port.

20. A method according to claim 15, comprising:
measuring a resultant signal through a coupler coupled to the calibration manifold about the second port.

* * * * *